United States Patent
Huang et al.

(10) Patent No.: US 11,200,318 B2
(45) Date of Patent: Dec. 14, 2021

(54) METHODS AND APPARATUS TO DETECT ADVERSARIAL MALWARE

(71) Applicant: McAfee, LLC, Santa Clara, CA (US)

(72) Inventors: Yonghong Huang, Hillsboro, OR (US); Raj Vardhan, College Station, TX (US); Celeste R. Fralick, Lubbock, TX (US); Gabriel G. Infante-Lopez, Cordoba (AR); Dattatraya Kulkarni, Bangalore (IN); Srikanth Nalluri, Bangalore (IN); Sonam Bothra, Bangalore (IN)

(73) Assignee: McAfee, LLC, San Jose, CA (US)

( * ) Notice: Subject to any disclaimer, the term of this patent is extended or adjusted under 35 U.S.C. 154(b) by 353 days.

(21) Appl. No.: 16/235,306

(22) Filed: Dec. 28, 2018

(65) Prior Publication Data

US 2020/0210575 A1 Jul. 2, 2020

(51) Int. Cl.
*G06F 21/00* (2013.01)
*G06F 21/56* (2013.01)
*G06N 20/00* (2019.01)
*G06F 21/53* (2013.01)

(52) U.S. Cl.
CPC ............ *G06F 21/566* (2013.01); *G06F 21/53* (2013.01); *G06N 20/00* (2019.01); *G06F 21/567* (2013.01); *G06F 2221/033* (2013.01)

(58) Field of Classification Search
CPC ...... G06N 3/088; G06N 3/084; G06N 3/0454; G06N 20/00; G06N 3/082; G06F 21/53; G06F 21/552; G06F 21/554; G06F 21/566; G06F 21/567; G06F 2221/033
See application file for complete search history.

(56) References Cited

U.S. PATENT DOCUMENTS

| 10,230,749 | B1 * | 3/2019 | Rostami-Hesarsorkh | |
|---|---|---|---|---|
| | | | | G06F 21/56 |
| 10,504,035 | B2 * | 12/2019 | Shteingart | G06N 20/00 |
| 10,542,034 | B1 * | 1/2020 | Shintre | G06N 3/08 |
| 10,846,407 | B1 * | 11/2020 | Serebryany | G06N 7/005 |
| 2012/0210423 | A1 * | 8/2012 | Friedrichs | H04L 63/1416 |
| | | | | 726/22 |

(Continued)

FOREIGN PATENT DOCUMENTS

WO  2016210205  12/2016

OTHER PUBLICATIONS

Wiyatno et al. "Maximal Jacobian-based Saliency Map Attack" Computer Science, Mathematics, ArXiv. Aug. 23, 2018. 5 pages. (Year: 2018).*

(Continued)

*Primary Examiner* — Don G Zhao
(74) *Attorney, Agent, or Firm* — Hanley, Flight & Zimmerman, LLC (57) ABSTRACT

Methods and apparatus to detect adversarial malware are disclosed. An example adversarial malware detector includes a machine learning engine to classify a first feature representation representing features of a program as benign or malware, a feature perturber to, when the first feature representation is classified as benign, remove a first one of the features to form a second feature representation, and a decider to classify the program as adversarial malware when the machine learning engine classifies the second feature representation as malware.

20 Claims, 9 Drawing Sheets

(56) References Cited

U.S. PATENT DOCUMENTS

| | | | | |
|---|---|---|---|---|
| 2013/0304869 | A1* | 11/2013 | Gupta | G06F 21/554 |
| | | | | 709/219 |
| 2014/0090061 | A1* | 3/2014 | Avasarala | G06F 21/56 |
| | | | | 726/24 |
| 2014/0165203 | A1* | 6/2014 | Friedrichs | G06F 21/552 |
| | | | | 726/24 |
| 2014/0187177 | A1* | 7/2014 | Sridhara | G06N 5/003 |
| | | | | 455/73 |
| 2014/0237595 | A1* | 8/2014 | Sridhara | G06F 21/55 |
| | | | | 726/23 |
| 2014/0283037 | A1* | 9/2014 | Sikorski | G06F 21/563 |
| | | | | 726/22 |
| 2014/0337862 | A1* | 11/2014 | Valencia | G06F 21/567 |
| | | | | 719/313 |
| 2015/0262067 | A1* | 9/2015 | Sridhara | H04L 63/14 |
| | | | | 706/12 |
| 2015/0356451 | A1* | 12/2015 | Gupta | G06F 21/552 |
| | | | | 706/52 |
| 2016/0379133 | A1* | 12/2016 | Shteingart | G06N 20/00 |
| | | | | 706/12 |
| 2016/0379135 | A1* | 12/2016 | Shteingart | G06N 20/00 |
| | | | | 706/12 |
| 2017/0026390 | A1* | 1/2017 | Sofka | G06F 21/566 |
| 2017/0032279 | A1* | 2/2017 | Miserendino | G06N 5/04 |
| 2017/0098074 | A1* | 4/2017 | Okano | G06F 21/567 |
| 2017/0262633 | A1* | 9/2017 | Miserendino | G06F 21/564 |
| 2018/0018459 | A1* | 1/2018 | Zhang | G06F 21/554 |
| 2018/0020024 | A1* | 1/2018 | Chao | G06F 17/18 |
| 2019/0080089 | A1* | 3/2019 | Chen | G06F 21/563 |
| 2019/0188605 | A1* | 6/2019 | Zavesky | G06N 20/00 |
| 2019/0215329 | A1* | 7/2019 | Levy | G06N 20/00 |
| 2019/0236490 | A1* | 8/2019 | Harang | G06F 21/56 |
| 2019/0244103 | A1* | 8/2019 | Wang | G06N 3/0454 |
| 2019/0251479 | A1* | 8/2019 | Anderson | H04L 63/1441 |
| 2019/0325163 | A1* | 10/2019 | Sharad | G06F 21/6227 |
| 2019/0354688 | A1* | 11/2019 | Ding | G06F 21/52 |
| 2020/0026996 | A1* | 1/2020 | Kolter | G06F 17/17 |
| 2020/0042704 | A1* | 2/2020 | Haim | G06F 21/565 |
| 2020/0074081 | A1* | 3/2020 | Srinivasagopalan | |
| | | | | G06F 21/566 |
| 2020/0082097 | A1* | 3/2020 | Poliakov | G06F 21/577 |
| 2020/0134468 | A1* | 4/2020 | Ding | G06N 3/088 |
| 2020/0159924 | A1* | 5/2020 | Tran | G06N 3/0454 |
| 2020/0162483 | A1* | 5/2020 | Farhady | G06N 3/04 |
| 2020/0167471 | A1* | 5/2020 | Rouhani | G06N 3/0454 |
| 2020/0184072 | A1* | 6/2020 | Ikeda | G06N 20/00 |
| 2020/0210573 | A1* | 7/2020 | Chistyakov | G06F 21/566 |
| 2020/0210577 | A1* | 7/2020 | Chistyakov | G06F 21/554 |
| 2020/0311262 | A1* | 10/2020 | Nguyen | H04L 63/1441 |

OTHER PUBLICATIONS

Carlini et al., "Adversarial Examples Are Not Easily Detected: Bypassing Ten Detection Methods," arXiv preprint arXiv: 1705.07263, Nov. 1, 2017, 12 pages.

Gong et al., "Adversarial and Clean Data Are Not Twins," arXiv preprint arXiv: 1704.04960, Apr. 17, 2017, 7 pages.

Grosse et al., "On the (Statistical) Detection of Adversarial Examples", arXiv preprint arXiv:1702.06280, Oct. 17, 2017, 13 pages.

Metzen et al., "On Detecting Adversarial Perturbations," International Conference on Learning Representations (ICLR), Feb. 21, 2017, 12 pages.

Hendrycks et al., "Early method for detecting adversarial images," International Conference on Learning Representations (ICLR), Mar. 23, 2017, 9 pages.

Bhagoji et al., "Dimensionality Reduction as a Defense against Evasion Attacks on Machine Learning Classifiers," arXiv preprint arXiv: 1704.02654, Apr. 11, 2017, 20 pages.

Li et al., "Adversarial Examples Detection in Deep Networks with Convolutional Filter Statistics," in Proc of Intl Conf on Computer Vision (ICCV), Oct. 26, 2017, 12 pages.

Feinman et al., "Detecting Adversarial Samples from Artifacts", in International Conference on Machine Learning (ICML), Nov. 15, 2017, 9 pages.

International Searching Authority, "International Search Report," issued in connection with International Patent No. PCT/US2019/067682, dated Mar. 17, 2020, 5 pages.

International Searching Authority, "Written Opinion," issued in connection with International Patent No. PCT/US2019/067682, dated Mar. 17, 2020, 6 pages.

Chen et al., "Automated Poisoning Attacks and Defenses in Malware Detection Systems: An Adversarial Machine Learning Approach," [https://arxiv.org/pdf/1706.04146.pdf], Oct. 31, 2017, 24 pages.

Rosenberg et al., "Generic Black-Box End-to-End Attack Against State of the Art API Call Based Malware Classifiers," [https://arxiv.org/abs/1707.05970], Accepted as a conference paper at RAID 2018, 20 pages.

Biggio et al.," Wild Patterns: Ten years After the Rise of Adversarial Machine Learning," [https://arxiv.org/pdf/1712.03141.pdf], Jul. 19, 2018, 17 pages.

Carlini et al., Adversarial Examples Are Not Easily Detected: Bypassing Ten Detection Methods, [https://arxiv.org/pdf/1705.07263.pdf], Nov. 1, 2017, 12 pages.

Gong et al., "Adversarialand Clean Data Are Not Twins," [https://arxiv.org/abs/1704.04960], Apr. 17, 2017, 7 pages.

Grosse et al., "On the (Statistical) Detection of Adversarial Examples," [https://arxiv.org/abs/1702.06280], Oct. 17, 2017, 13 pages.

Metzen et al., "On Detecting Adversarial Perturbations," [https://arxiv.org/abs/1702.04267], ICLR 2017, Feb. 21, 2017, 12 pages.

Hendrycks et al., "Early Methods For Detecting Adversarial Images," [https://arxiv.org/abs/1608.00530], ICLR 2017, Mar. 23, 2017, 9 pages.

Bhagoji et al., "Dimensionality Reduction as a Defense against Evasion Attacks on Machine Learning Classifiers," [https://128.84.21.199/abs/1704.02654v2], Apr. 11, 2017, 20 pages.

Li et al., "Adversarial Examples Detection In Deep Networks with Convolutional Filter Statistics," [https://arxiv.org/abs/1612.07767], Oct. 26, 2017, 12 pages.

Feinman et al., "Detecting Adversarial Samples from Artifacts," [https://arxiv.org/abs/1703.00410], Nov. 15, 2017, 9 pages.

Stokes et al., "Attack and Defense of Dynamic Analysis-Based, Adversarial Neural Malware Classification Models," [https://arxiv.org/pdf/1712.05919.pdf], Dec. 16, 2017, 12 pages.

* cited by examiner

FIG. 1

```
6c9de6b31090c32c858c30d72274d8d2bce535363188d64614196463072d
   feature::android.hardware.touchscreen
   api_call::org/apache/http/impl/client/DefaultHttpClient
   intent::android.intent.category.HOME
   service_receiver::.Notificator
   activity::.Main
   permission::android.permission.RECEIVE_SMS
   permission::android.permission.INTERNET
   service_receiver::com.google.android.c2dm.C2DMBroadcastReceiver
   intent::android.intent.action.BOOT_COMPLETED
   call::HttpPost
   real_permission::android.permission.WAKE_LOCK
   service_receiver::.C2DMReceiver
   service_receiver::.SmsReceiver
   permission::com.google.android.c2dm.permission.RECEIVE
   real_permission::android.permission.VIBRATE
   permission::android.permission.READ_PHONE_STATE
   permission::android.permission.SEND_SMS
   call::getSystemService
   api_call::android/os/PowerManager$WakeLock;->acquire
   intent::com.google.android.c2dm.intent.RECEIVE
   service_receiver::.Checker
   intent::com.google.android.c2dm.intent.REGISTRATION
   intent::android.intent.action.DATA_SMS_RECEIVED
   real_permission::android.permission.SEND_SMS
   api_call::android/telephony/SmsManager;->sendTextMessage
   permission::android.permission.READ_SMS
   feature::android.hardware.telephony
   api_call::android/content/Context;->sendBroadcast
   permission::android.permission.WAKE_LOCK
   call::sendSMS
   api_call::android/app/NotificationManager;->notify
   intent::android.intent.action.MAIN
   permission::android.permission.WRITE_EXTERNAL_STORAGE
   permission::com.software.application.permission.C2D_MESSAGE
   real_permission::android.permission.INTERNET
   intent::android.intent.category.LAUNCHER
```

| | Training | Testing | Validation |
|---|---|---|---|
| No. of samples | 42999 samples (1870 malware, 41129 benign) | 43013 samples (1793 malware, 41220 benign) | 42998 samples (1896 malware, 41102 benign) |
| Accuracy | 99.51% | 99.14% | 99.05% |
| Detection Rate | 90.69% | 84.16% | 82.80% |
| False Positives | 174 | 284 | 326 |
| False Negatives | 36 | 85 | 79 |
| True Positives | 1696 | 1509 | 1570 |
| True Negatives | 41093 | 41135 | 41023 |

| No. of perturbations | Detection Rate (%) on Training Set | Detection Rate (%) on Testing Set | Detection Rate (%) on Validation Set | Averaged Detection Rate (%) |
|---|---|---|---|---|
| 0 | 90.69 | 84.16 | 82.80 | 85.89278287 |
| 1 | 52.62032086 | 50.64138316 | 49.73628682 | 50.99838097 |
| 2 | 21.22994653 | 20.41271612 | 20.99156118 | 20.88505127 |
| 3 | 9.30481284 | 8.53318461 | 9.22995784 | 9.030401166 |
| 4 | 6.31016043 | 5.35415505 | 6.5400844 | 6.080230263 |
| 5 | 3.74331552 | 3.29057446 | 4.43037975 | 3.831624399 |
| 6 | 3.20855616 | 2.39821528 | 3.53375528 | 3.05810398 |
| 7 | 3.15508022 | 2.39821528 | 3.42827005 | 3.004137439 |
| 8 | 0.32085561 | 0.22308979 | 0.42194093 | 0.323799242 |
| 9 | 0.32085561 | 0.22308979 | 0.26371308 | 0.269832701 |
| 10 | 0.21390374 | 0.16731735 | 0.10548523 | 0.161899632 |

METHODS AND APPARATUS TO DETECT ADVERSARIAL MALWARE

FIELD OF THE DISCLOSURE

This disclosure relates generally to malware detection, and, more particularly, to methods and apparatus to detect adversarial malware.

BACKGROUND

Malware (e.g., viruses, worms, trojans, ransomware) is malicious software that is disseminated by attackers to launch a wide range of security attacks, such as stealing user's private information, hijacking devices remotely to deliver massive spam emails, and infiltrating user's online account credentials. Malware has caused serious damages and significant financial loss to many computer and Internet users.

BRIEF DESCRIPTION OF THE DRAWINGS

FIG. 2 illustrates an example log file with a list of features of an example program.

FIG. 3 illustrates an example feature vector that may be used to form a feature representation.

In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

In order to protect users against the evolving threats malware poses, its detection is of utmost concern to the anti-malware industry, researchers, and end users. Recently, systems using machine learning techniques have been increasingly applied and successfully deployed in malware detection. However, the effectiveness of machine learning techniques relies on the training data, testing data, and real world data having similar characteristics. This assumption can be violated by an adversary who creates adversarial malware by specifically modifying (e.g., adding) features (e.g., a behavior, an action, a function call, an application programming interface (API) call, a data access, a uniform resource locator (URL) call, etc.) of malware to avoid detection. The feature modifications made to create adversarial malware are specifically chosen to mask, disguise, etc. the malware contained in the adversarial malware from being detected. The careful manipulation of the malware can be used to exploit vulnerabilities of a machine learning engine (e.g., trick, manipulate, etc. the machine learning engine), thereby compromising its security. For example, conventional machine learning is susceptible to an adversary who maliciously releases and identifies adversarial malware as a benign program that is unknowingly used by another party to train a machine learning engine. The added features are specifically chosen to mask aspects of the malware so the modified program is classified as benign rather than malware. In another example, an adversary modifies features and re-tests their adversarial malware using a machine learning engine trained by another until the adversarial malware is mistakenly classified as benign.

The teachings of this disclosure can used to detect modification(s) of the features of malware by an adversary to form adversarial malware, thereby enabling adversarial malware attacks, that would go undetected by conventional malware detectors, to be blocked. Reference will now be made in detail to non-limiting examples, some of which are illustrated in the accompanying drawings.

Figure 1:
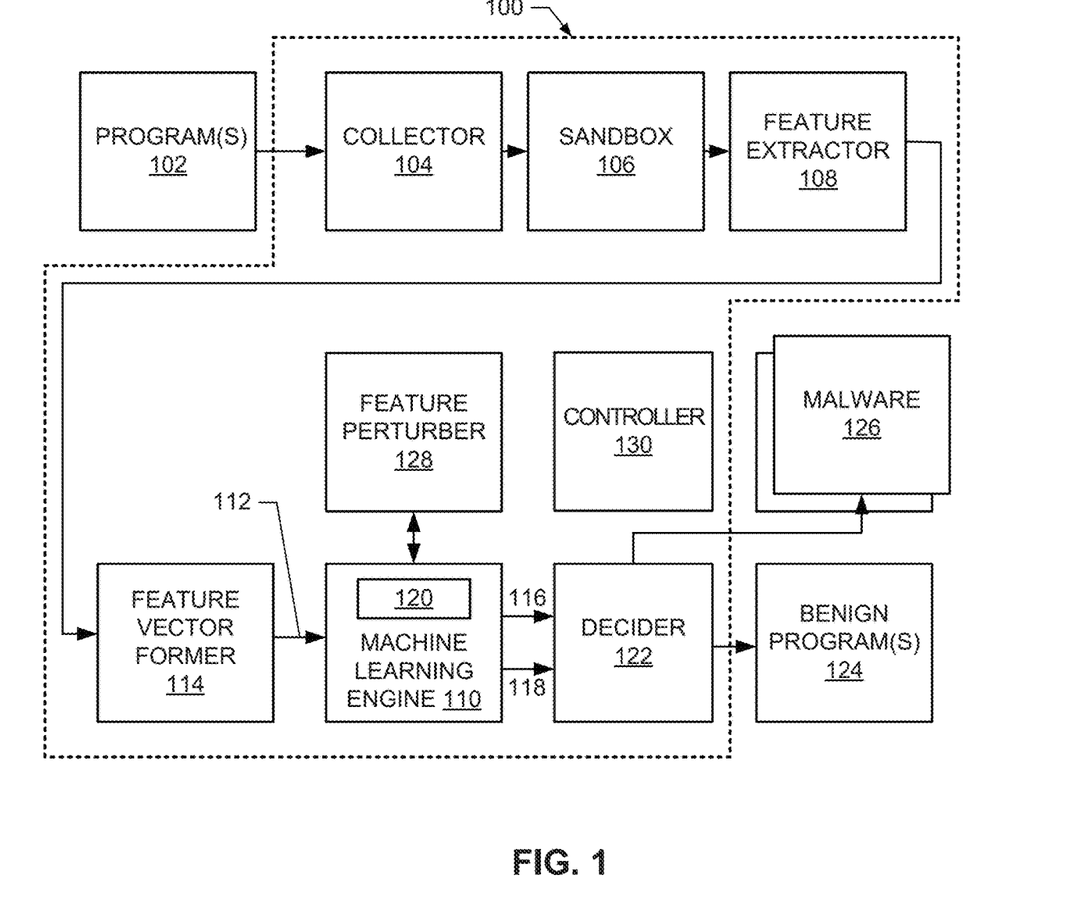
FIG. 1 illustrates an example adversarial malware detector constructed in accordance with teachings of this disclosure, and shown in an example environment of use.

FIG. 1 is a block diagram of an example adversarial malware detector 100 constructed in accordance with teachings of this disclosure. To obtain input data (e.g., a program 102), the example adversarial malware detector 100 of FIG. 1 includes an example collector 104. The example collector 104 of FIG. 1 obtains the program 102 by, for example, querying another system (e.g., a computer, a server, etc.), receiving the program 102 from another system, etc. In some examples, the collector 104 loads the program 102 into the memory of a processing platform for subsequent processing.

To determine the features of each program 102 to be classified by the example adversarial malware detector 100, the adversarial malware detector 100 of FIG. 1 includes an example sandbox 106, and an example feature extractor 108. The example sandbox 106 of FIG. 1 is a testing environment in which the execution, operation and processes of each program 102 is not affected by other running programs (e.g., machine executable instructions executing on a processor that implements the adversarial malware detector 100), and do not affect other running programs. The example sandbox 106 allows suspicious software and files potentially containing malware or malicious code to be safely observed, tested, evaluated, etc.

The example feature extractor 108 of FIG. 1 identifies the features of each program 102 as the program 102 executes in the sandbox 106. The feature extractor 108 observes features that are useful to a machine learning engine 110 for classifying the program 102 using, for example, static analysis, dynamic analysis, etc. Example observed features include aspects of the program 102, such as behaviors, actions, function calls, API calls, data accesses, URL calls, etc. FIG. 2 is an example log file containing a listing of example features 200 identified by the example feature extractor 108 for a program of the DREBIN test set having a SHA5 value of 00c8de6b31090c32b65f8c30d7227488d2bce5353b31bedf5461419ff463072d.

The example adversarial malware detector 100 of FIG. 1 includes an example feature vector former 114 to form a feature representation 112 that represents the characterizing features of each program 102 to be classified. An example feature vector 300 that may be used to form a feature representation 112 is shown in FIG. 3. The example feature vector 300 of FIG. 3 has a plurality of entries (one of which is designated at reference numeral 302) that correspond to respective features of a universe of features. In the illustrated example of FIG. 3, an entry 302 has a first value (e.g., zero) when the respective feature is not present, and the entry 302 has a second value (e.g., one) when the respective feature is present. The universe of features is the superset of features across a plurality of programs 102 used to train the machine learning engine 110. A feature is perturbed by changing the value of its corresponding entry 302 from the first value to the second value, or vice versa.

To classify programs 102, the example adversarial malware detector 100 of FIG. 1 includes the example machine learning engine 110. Inputs of the machine learning engine 110 for a program 102 are the entries of the feature representation 112 (e.g., formed according to the example feature vector 300) of the program 102. The example machine learning engine 110 outputs a first value 116 that represents a likelihood (e.g., a classification probability) that the program 102 being classified is benign, and outputs a second value 118 that represents a likelihood (e.g., a classification probability) that the program 102 being classified is malware. When reference is made to the classification of a feature representation 112 by inputting the feature representation 112 to the machine learning engine 110, it should be understood that it is the program 102 as represented by the feature representation 112 that is being classified. Similarly, when a modified, perturbed, etc. feature representation 112 is classified by inputting the modified feature representation 112 to the machine learning engine 110, it is the program 102 as if it had been corresponding modified form that is being classified.

In some examples, the machine learning engine 110 of FIG. 1 is a deep neural network having multiple interconnected layers, each layer having a plurality of interconnected nodes. The interconnections between nodes and layers have associated coefficients (e.g., weights) that represent the strength of the interconnections. The coefficients form a classification model 120 that is implemented (e.g., carried out by) the machine learning engine 110. In some examples, the machine learning engine 110 includes an input layer, two hidden layers and an output layer. The dimension of the input layer is the number of features in a feature vector (e.g., 14406). An example first hidden layer is a first dense layer and dropout with a dimension of 200. An example second hidden layer is a second dense layer and dropout with a dimension of 200. An example output layer includes an activation function and has a dimension of 2.

To decide whether a program 102 being classified is benign or malware, the example adversarial malware detector 100 of FIG. 1 includes an example decider 122. The example decider 122 of FIG. 1 uses the classification probabilities 116 and 118 to decide benign vs. malware. For example, if the classification probability 116 is larger than the classification probability 118, the decider 122 classifies the program 102 as benign, and, if the classification probability 118 is larger than the classification probability 116, the decider 122 classifies the program 102 as malware.

For each program 102 classified by the decider 122 as benign, the decider 122 allows the benign program 124 to be subsequently used, opened, executed, transferred, etc. For each program 102 classified by the decider 122 as malware, the decider 122 blocks, quarantines, segregates, etc. the malware 126 such that the malware 126 cannot be used, opened, executed, transferred, etc.

Figure 4:
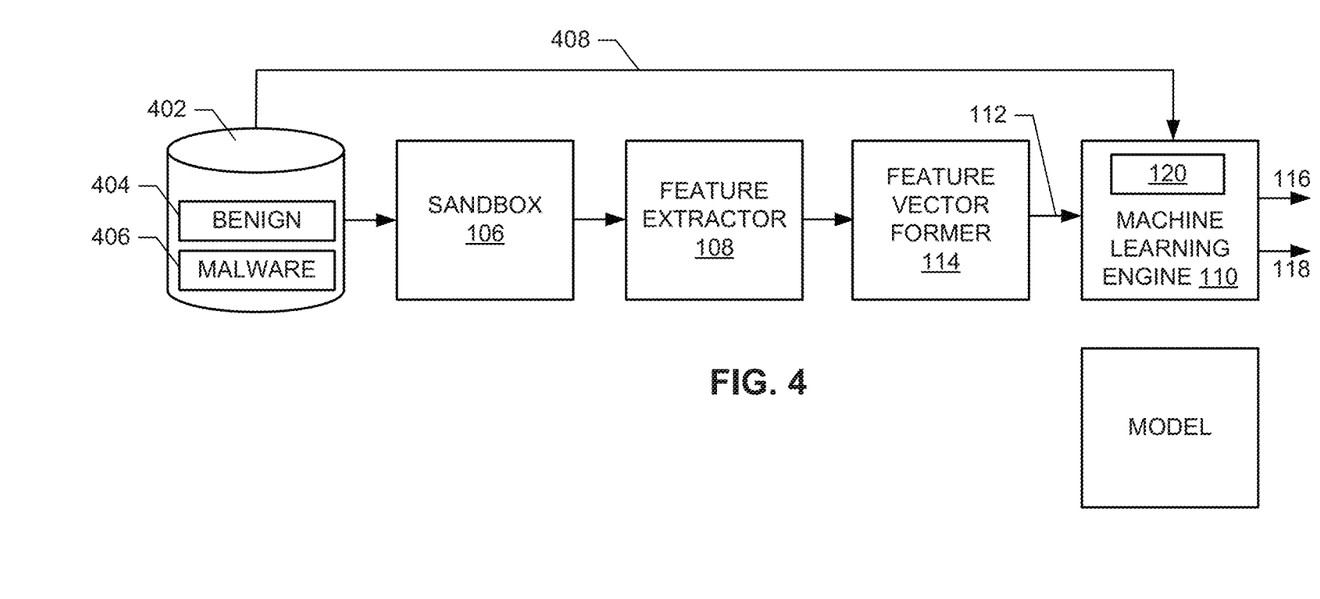
FIG. 4 is a block diagram of an example system for training the example machine learning engine of FIG. 1.

As shown in FIG. 4, the coefficients of the classification model 120 implemented by the example machine learning engine 110 can be trained using supervised learning and a set of programs having known classifications (e.g., the DREBIN test set 402). The DREBIN test set has 41129 benign programs 404, and 1870 malware programs 406. Each program of the DREBIN test set 402 is processed through the sandbox 106, the feature extractor 108, and the feature vector former 114 to form a feature representation 112. Each feature representation 112 is passed through the machine learning engine 110, and resultant classifications made by the under training machine learning engine 110 are compared to—a known classification 408 corresponding to the feature representation 112. The machine learning engine 110 uses, for example, backpropagation, to update the coefficients of the classification model 120 based on whether the classification probabilities 116, 118 correspond with the known classifications 408.

Figure 5:
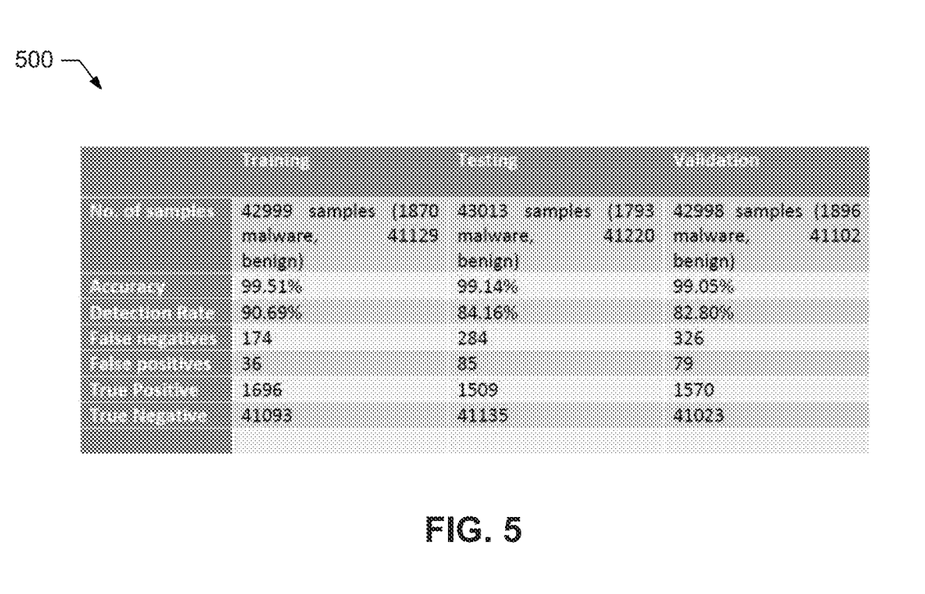
FIG. 5 is a table of example training results for the example adversarial malware detector of FIG. 1.

During use of the adversarial malware detector 100 to classify programs 102, programs 102 are processed through the sandbox 106, the feature extractor 108, and the feature vector former 114 to form a feature representation 112. Each feature representation 112 is input to the machine learning engine 110 to obtain the classification probabilities 116, 118. The decider 122 classifies the associated program 102 based on its classification probabilities 116, 118. Once trained, the DREBIN test set 402 can be classified by the machine learning engine 110 implementing the model 120 and its results tabulated, as shown in the example table 500 of FIG. 5. As shown, the example machine learning engine 110 of FIG. 1 can be used to classify programs 102 of the DREBIN test set 402 with approximately ninety-nine percent (99%) accuracy.

Figure 6:
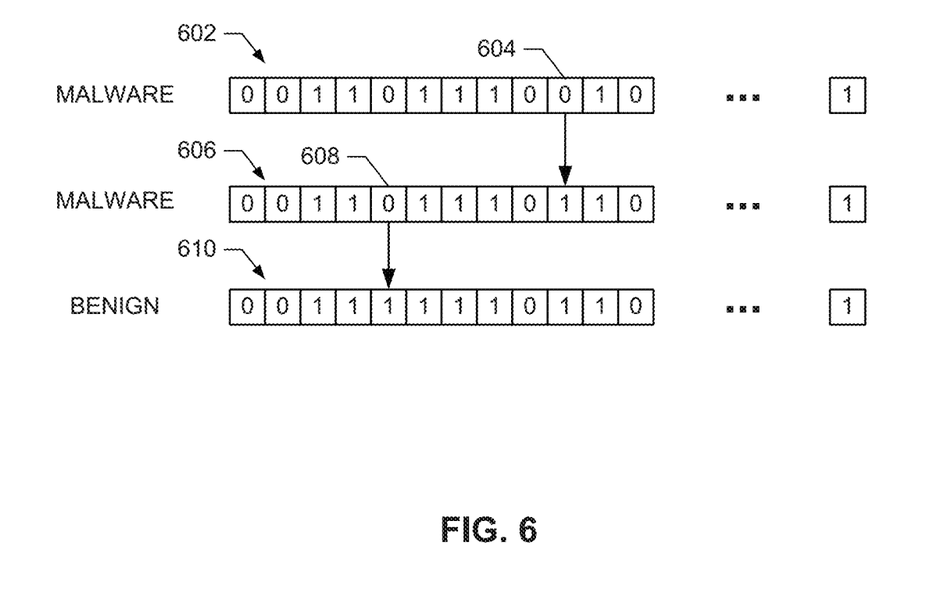
FIG. 6 is a diagram of example adversarial feature perturbations.

Conventional machine learning is susceptible to adversarial malware. In an illustrated example attack shown in FIG. 6, an attacker modifies malware having a first feature representation 602 to include a first additional feature 604, which results in a second modified feature representation 606. Because the second modified feature representation 606 still results in a malware classification, the attacker further modifies the second modified feature representation 606 to add a second additional feature 608, which results in a third modified feature representation 610. In the illustrated example, the resultant program, which is now adversarial malware, includes the original malware plus the additionally added first feature 604 and the additionally added second feature 608. The adversarial malware represented by the feature representation 610 would be classified as benign by conventional machine learning, even though it contains the original malware, because the added first feature 604 and the added second feature 606 mask the original malware from detection. In some examples, features are only added to create adversarial malware. Removal of an original feature from the malware could keep the malware from operating as intended, e.g., may change the functionality of the malware.

Figure 7:
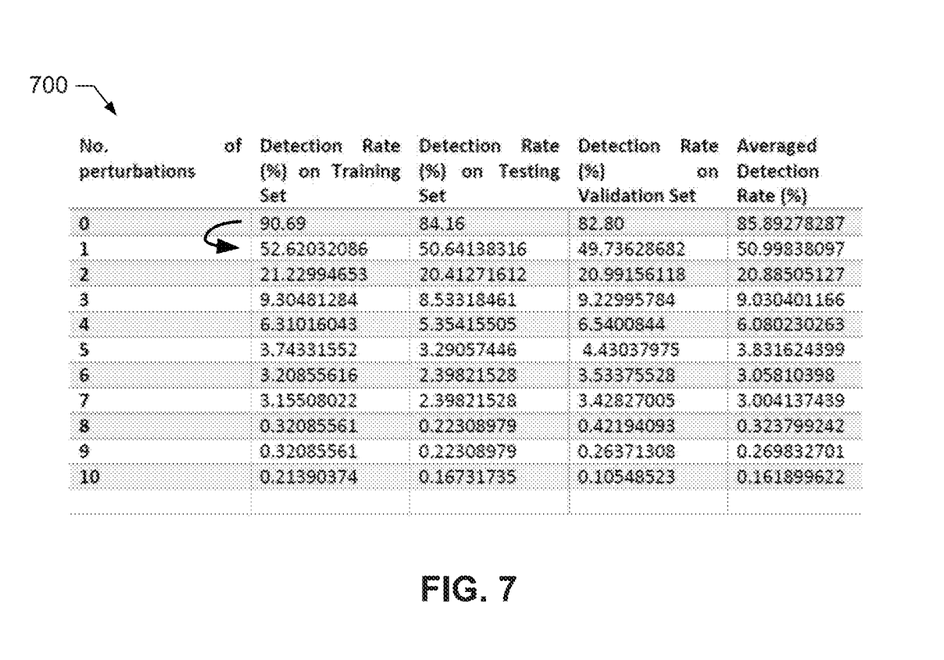
FIG. 7 is a table of example classification results in the presence of adversarial feature perturbations.

FIG. 7 is a table 700 of classification statistics for different numbers of feature perturbations. As shown in the table 700 of FIG. 7, as the number of perturbations of a feature representation increases (e.g., from no perturbations to one perturbation), the accuracy of malware detection dramatically decreases from 90.7% to 52.6% for the training set. Thus, as shown, an adversary can hide malware by modifying its feature representation, so it becomes incorrectly classified as benign.

To combat adversarial malware, the example adversarial malware detector 100 of FIG. 1 includes an example feature perturber 128. The example feature perturber 128 of FIG. 1 and the machine learning engine 110 identify when a program that is being classified as benign by the machine learning engine 110 is actually adversarial malware (e.g., it originated from a malware through one or more feature perturbations). If the feature perturber 128, by iteratively, progressively, sequentially, etc. removing one or more features of a program, causes the classification of the program to change from benign to malware, the adversarial malware detector 100 identifies the program as adversarial malware. Such adversarial malware contains certain extraneous but carefully computed behaviors that were adversarially added to the program to increase its likelihood of evading detection. In some examples where features are only added to create adversarial malware, only features are removed when detecting adversarial malware.

Figure 8:
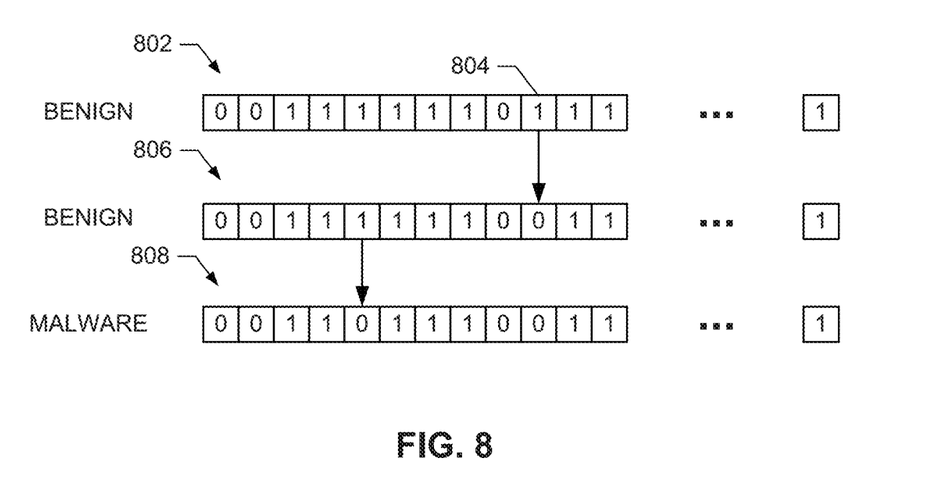
FIG. 8 is a diagram of example feature perturbations to detect adversarial feature perturbations.

When the example machine learning engine 110 classifies a program 102 as benign based on its feature representation 802 (see FIG. 8), the example feature perturber 128 of FIG. 1 perturbs the feature representation 802 to remove a trial feature 804, forming a perturbed feature representation 806. The trial feature 804 is selected for being a potentially adversarially added feature to mask malware. The machine learning engine 110 re-classifies the program 102 based on the perturbed feature representation 806. If the perturbed feature representation 806 is still classified as benign as shown in FIG. 8, further trial perturbations to remove further potential adversarially added features, and re-classifications may be performed. In the example of FIG. 8, after one further trial perturbed feature representation 808 is formed, the program 102 is classified as malware. If the program 102 remains classified as benign after the trial perturbations, the original program 102 is considered to be a presumably actually benign program. If the program 102 is classified as malware at any stage, the decider 122 classifies the original program 102 as malware masquerading as a fake benign program. Feature perturbation and classification are ended when the program 102 is classified as malware or until the number of steps (e.g., perturbations) crosses a predefined threshold (e.g., two).

For each perturbation, the example feature perturber 128 selects an entry 302 of the feature representation 112 for the program 102 having a value of one (e.g., feature found in the program 102 being classified). The entry 302 is selected for representing a feature that, if removed, would increase (e.g., maximize, etc.) the likelihood of the machine learning engine 110 classifying the modified feature vector as malware. In some examples, likelihoods are computed using the Jacobian-based saliency map approach (JSMA) attack method modified to identify features, that when changed from 1 to 0, will increase the likelihood of a program's classification changing from benign to malware. The JSMA attack method is designed to select perturbations based on the characteristics of the model 120 that increases the likelihood of a changed classification. However, other attack methodologies (e.g., CleverHans, Fast Gradient Step Method (FGSM), DeepFool, etc.) may be used. For example, iterating over ones and/or combinations of features. In some examples, different attack methodologies are used to choose features for perturbations sequentially, and/or in parallel.

In some instances, genuine benign samples could potentially be classified as malware after feature perturbation. Such sample would represent a false positive. In an example empirical study, only a small proportion (2-3%) of genuine benign samples were classified as malware after feature perturbation. Under such circumstances, changes to reduce false positives may also increase false negatives. Thus, an attack method may be tuned to tradeoff false positives and false negatives. In some disclosed examples, false positives found with a test set are fed back into the training set as benign, and the model 120 re-trained. For instance, let's say a feature vector X is being classified as benign but on removing certain features using the examples of this disclosure to form a modified feature vector Xmod is mis-classified as malware even though it is a known to be benign. Thus, X would be incorrectly marked adversarial. As this is a false positive, we can feed Xmod into the training set as a benign sample, and retrain our model so that such mistakes are not repeated in future for similar samples. Additionally, and/or alternatively, existing malware detectors that can detect well known benign samples (e.g., using white-lists) are used so that genuine benign samples are not marked as adversarial.

To control the example adversarial malware detector 100 of FIG. 1, the example adversarial malware detector 100 includes an example controller 130. The example controller 130 of FIG. 1, among other things, coordinates the operations of the machine learning engine 110, the decider 122 and the feature perturber 128. For example, the controller 130 controls the machine learning engine 110 and the decider 122 to classify a program 102 based on its feature representation 112. If the program 102 is classified by the decider 122 as benign, the controller 130 controls the feature perturber 128 to perturb a feature of the feature representation 112, and then controls the machine learning engine 110 and the decider 122 to re-classify the program based on the modified feature representation 112. The controller 130 continues controlling the feature perturber 128, the machine learning engine 110, and the decider 122 until the program 102 is classified as malware or until the number of steps (e.g., perturbations) crosses a predefined threshold (e.g., two).

While an example manner of implementing the adversarial malware detector 100 is illustrated in FIG. 1, one or more of the elements, processes and/or devices illustrated in FIG. 4 may be combined, divided, re-arranged, omitted, eliminated and/or implemented in any other way. Further, the example collector 104, the example sandbox 106, the example feature extractor 108, the example machine learning engine 110, the example feature vector former 114, the example decider 122, the example feature perturber 128, the controller 130 and/or, more generally, the example adversarial malware detector 100 of FIG. 1 may be implemented by hardware, software, firmware and/or any combination of hardware, software and/or firmware. Thus, for example, any of the example collector 104, the example sandbox 106, the example feature extractor 108, the example machine learning engine 110, the example feature vector former 114, the example decider 122, the example feature perturber 128, the controller 130 and/or, more generally, the example adversarial malware detector 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), and/or field programmable gate array(s) (FPGA(s)). When reading any of the apparatus or system claims of this patent to cover a purely software and/or firmware implementation, at least one of the example collector 104, the example sandbox 106, the example feature extractor 108, the example machine learning engine 110, the example feature vector former 114, the example decider 122, the example feature perturber 128, the controller 130 and/or, the example adversarial malware detector 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example adversarial malware detector 100 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
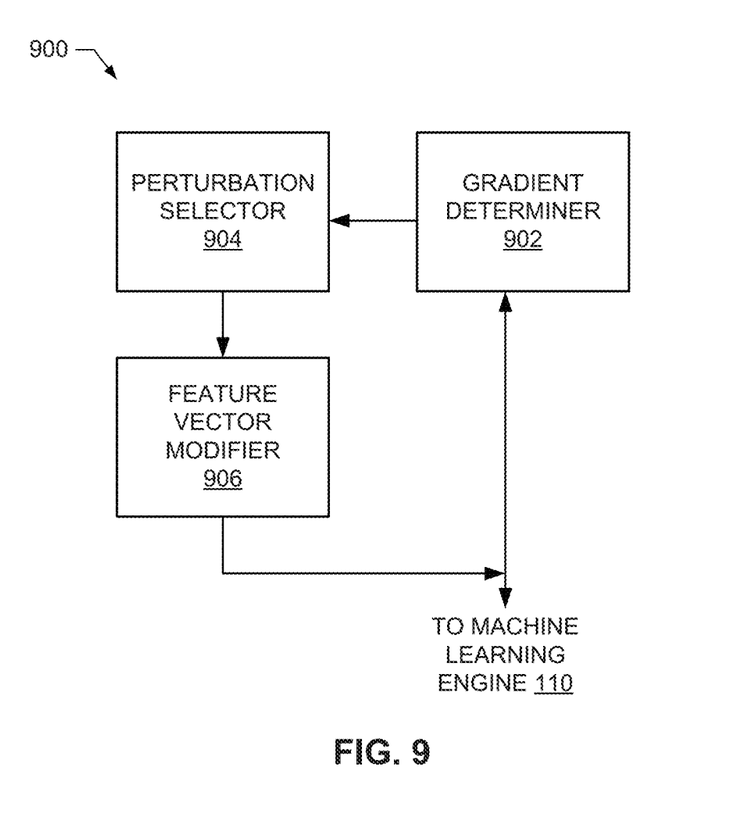
FIG. 9 is a block diagram of an example feature perturber that may be used to implement the example feature perturber of FIG. 1.

FIG. 9 is a block diagram of an example feature perturber 900 that may be used to implement the example feature perturber 128 of FIG. 1. To determine likelihoods that different feature perturbations would result in a change in classification, the example feature perturber 900 includes an example gradient determiner 902. The example gradient determiner 902 uses the JSMA attack process. For example, the gradient determiner 902 computes gradients of a model F with respect to an unknown X to estimate the direction in which a perturbation in X would change F's output. Here $F(X)=[F_0(X), F_1(X)]$ represents the machine learning engine 110, X is a feature representation 112, and $F_0(X)$, $F_1(X)$ are the classification probabilities 116, 118.

To choose feature perturbations, the example feature perturber 900 includes an example perturbation selector 904. The example perturbation selector 904 selects the feature perturbation representing a large (e.g., largest, maximum, etc.) positive gradient toward a benign classification. The gradients can be obtained from a Jacobian Matrix, which can be expressed mathematically as $$J_F = \frac{\partial F(X)}{\partial X} = \left[\frac{\partial F_i(X)}{\partial X_j}\right]_{i \in 0,1, j \in [1,m]}$$

where m—is the number of features.

To modify feature representations (e.g., feature vectors), the example feature perturber 900 includes a feature vector modifier 906. The example feature vector modifier 906 modifies the entry of a feature representation 112 (e.g., the entry 302 of the feature vector 300) corresponding to the largest positive gradient toward a benign classification to remove the feature from the feature vector (e.g., change its entry from one to zero). The modified feature representation formed by the feature vector modifier 906 is routed through the machine learning engine 110 for re-classification.

The example feature perturber 900 was tested using 1870 adversarial malware unknowns using the JSMA attack process. Using the example adversarial malware detector 100 and the example feature perturber 900, 95.61% of the adversarial unknowns were correctly identified as malware. Of 12,000 genuine benign programs from the DREBIN test set 402, only 2.63% were incorrectly identified as malware.

While an example manner of implementing the example feature perturber 128 of FIG. 1 is illustrated in FIG. 9, one or more of the elements, processes and/or devices illustrated in FIG. 9 may be combined, divided, re-arranged, omitted, eliminated and/or implemented in any other way. Further, the example gradient determiner 902, the example perturbation selector 904, the example feature vector modifier 906, and/or, more generally, the example feature perturber 900 of FIG. 9 may be implemented by hardware, software, firmware and/or any combination of hardware, software and/or firmware. Thus, for example, any of the example gradient determiner 902, the example perturbation selector 904, the example feature vector modifier 906, and/or, more generally, the example feature perturber 900 could be implemented by one or more analog or digital circuit(s), logic circuits, programmable processor(s), programmable controller(s), GPU(s), DSP(s), ASIC(s), PLD(s), FPLD(s), and/or FPGA(s). When reading any of the apparatus or system claims of this patent to cover a purely software and/or firmware implementation, at least one of the gradient determiner 902, the perturbation selector 904, the feature vector modifier 906, and the feature perturber 900 of FIG. 9 is/are hereby expressly defined to include a non-transitory computer-readable storage device or storage disk such as a memory, a DVD, a CD, a Blu-ray disk, etc. including the software and/or firmware. Further still, the example feature perturber 900 of FIG. 9 may include one or more elements, processes and/or devices in addition to, or instead of, those illustrated in FIG. 9, and/or may include more than one of any or all of the illustrated elements, processes and devices.

Figure 10:
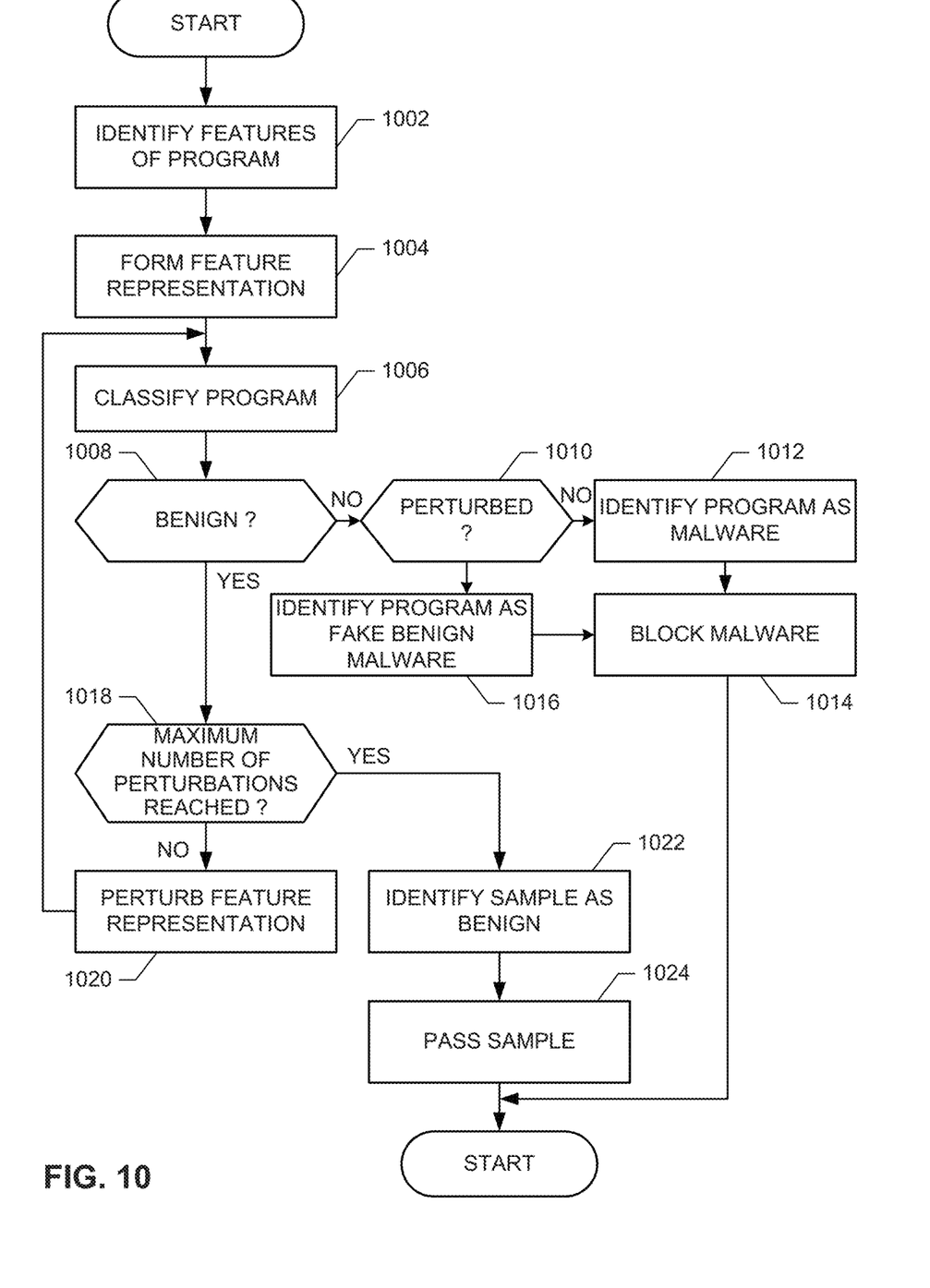
FIG. 10 is a flowchart representative of example hardware logic or machine-readable instructions for implementing the example adversarial malware detector of FIG. 1 to perform malware detection.

A flowchart representative of example hardware logic, machine-readable instructions, hardware implemented state machines, and/or any combination thereof for implementing the adversarial malware detector 100 of FIG. 1 is shown in FIG. 10. The machine-readable instructions may be a program or portion of a program for execution by a computer processor such as the processor 1210 shown in the example processor platform 1200 discussed below in connection with FIG. 12. The program may be embodied in software stored on a non-transitory computer-readable storage medium such as a compact disc read-only memory (CD-ROM), a floppy disk, a hard drive, a DVD, a Blu-ray disk, or a memory associated with the processor 1210, but the entire program and/or parts thereof could alternatively be executed by a device other than the processor 1210 and/or embodied in firmware or dedicated hardware. Further, although the example program is described with reference to the flowchart illustrated in FIG. 10, many other methods of implementing the example adversarial malware detector 100 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The example program of FIG. 10 begins at block 1002, where the example feature extractor 108 observes the example sandbox 106 to extract the features of a program 102 (block 1002). The example feature vector former 114 forms a feature representation 112 for the program 102 (block 1004). In some examples, the feature representation is formed based on the example feature vector 300 of FIG.

3. The example machine learning engine 110 and the example decider 122 classify the program 102 based on the feature representation 112 (block 1006).

If the program 102 is classified as malware (block 1008), and no feature perturbations have been performed (block 1010), the program 102 is identified as malware 126 (block 1012), and is blocked, quarantined, segregated, etc. so the malware 126 cannot be used, opened, executed, transferred, etc. (block 1014). Control exits from the example program of FIG. 10.

Returning to block 1010, if a feature perturbation has been performed (block 1010), the program 102 is identified as a fake benign program, i.e., is adversarial malware (block 1016), and is blocked, quarantined, segregated, etc. so the malware 126 cannot be used, opened, executed, transferred, etc. (block 1014). Control exits from the example program of FIG. 10.

Returning to block 1008, if the program 102 is classified as benign (block 1008) and a maximum number of feature perturbations has not been reached (block 1018), the example feature perturber 128 perturbs one or more features of the feature representation 112 to create a modified feature representation (block 1020). The machine learning engine 110 and the decider 122 re-classify the program 102 based on the modified feature representation 112 (block 1006).

Returning to block 1018, if a maximum number of feature perturbations (e.g., two) has been reached (block 1018), the program 102 is classified as benign (block 1022), and the program 102 is allowed to be subsequently used, opened, executed, transferred, etc. (block 1024). Control exits from the example program of FIG. 10.

Figure 11:
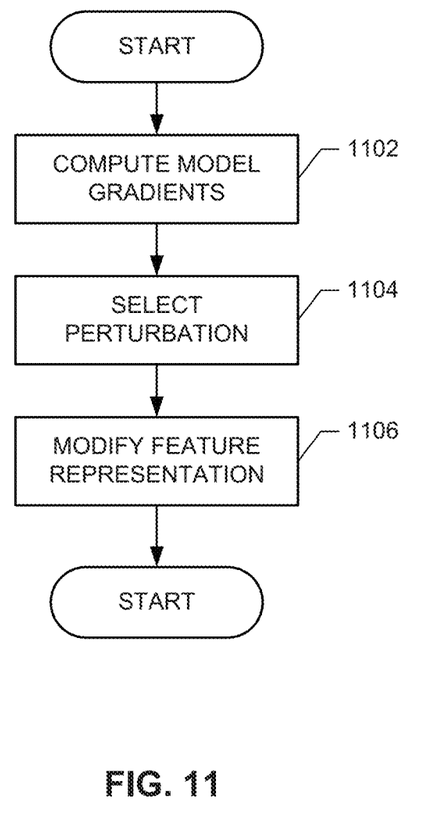
FIG. 11 is a flowchart representative of example hardware logic or machine-readable instructions for implementing the feature perturber of FIG. 1 and/or the feature perturber of FIG. 9 to perturb feature representations.

A flowchart representative of example hardware logic, machine-readable instructions, hardware implemented state machines, and/or any combination thereof for implementing the example feature perturber 128 of FIG. 1 and/or the example feature perturber 900 of FIG. 9 is shown in FIG. 11. The machine-readable instructions may be a program or portion of a program for execution by a computer processor such as the processor 1210 shown in the example processor platform 1200 discussed below in connection with FIG. 12. The program may be embodied in software stored on a non-transitory computer-readable storage medium such as a compact disc read-only memory (CD-ROM), a floppy disk, a hard drive, a DVD, a Blu-ray disk, or a memory associated with the processor 1210, but the entire program and/or parts thereof could alternatively be executed by a device other than the processor 1210 and/or embodied in firmware or dedicated hardware. Further, although the example program is described with reference to the flowchart illustrated in FIG. 11, many other methods of implementing the example feature perturber 128 of FIG. 1 and/or the example feature perturber 900 of FIG. 9 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The example program of FIG. 11 begins at block 1102, where the example gradient determiner 902 computes gradients of a model F with respect to an X having a known classification to estimate the direction in which a perturbation in X would change F's output, where $F(X)=[F_0(X), F_1(X)]$ represents the machine learning engine 110, X is a feature representation 112, and $F_0(X)$, $F_1(X)$ are the classification probabilities 116, 118 (block 1102). The example perturbation selector 904 selects the feature perturbation that represents the largest gradient in the direction of benign (block 1104), and the example feature vector modifier 906 modifies the selected feature in the feature representation 112 (block 1106). Control exits from the example program of FIG. 11.

As mentioned above, the example processes of FIGS. 10 and 11 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 12:
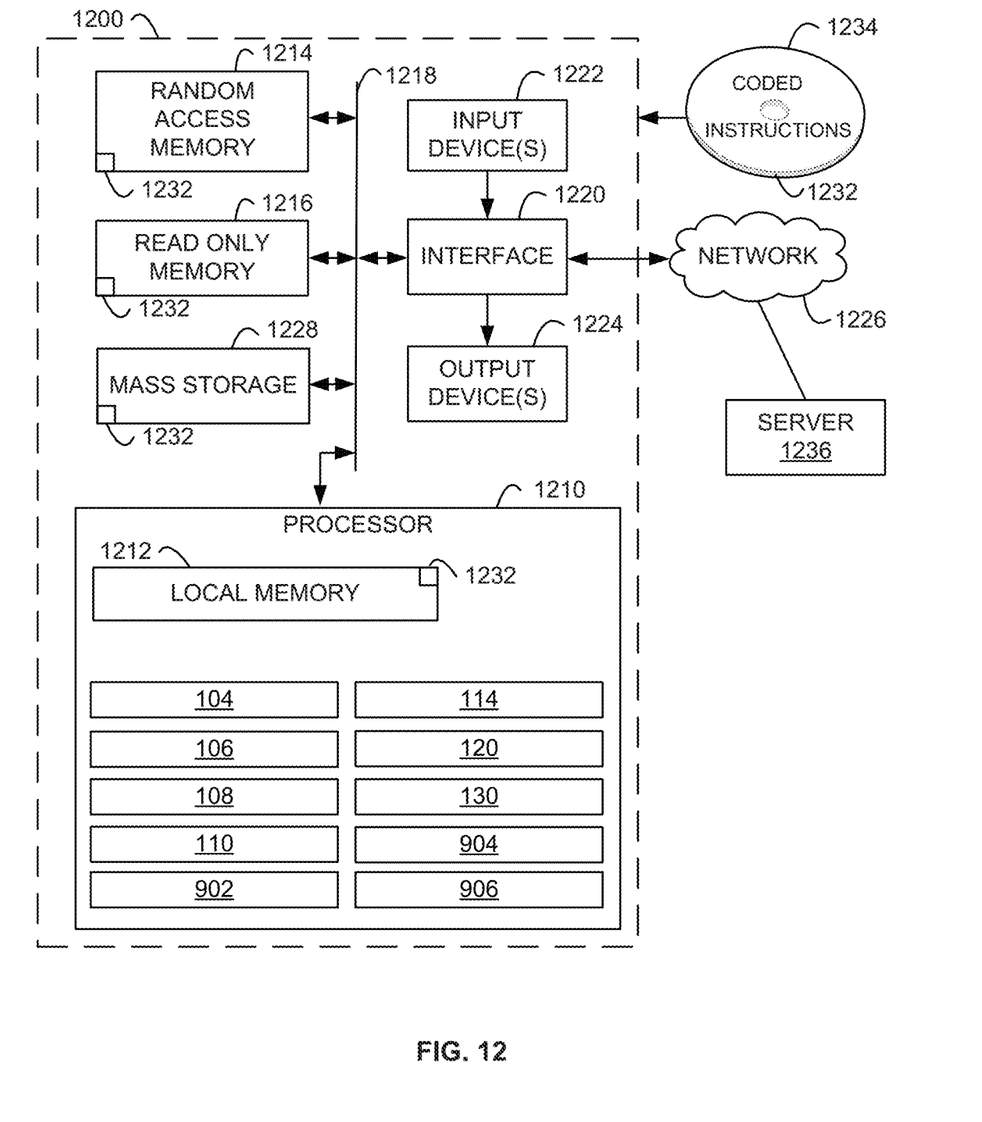
FIG. 12 illustrates an example processor platform structured to execute the example machine-readable instructions of FIG. 9 and/or FIG. 10.

FIG. 12 is a block diagram of an example processor platform 1200 structured to execute the instructions of FIGS. 10 and 11 to implement the example adversarial malware detector 100 of FIG. 1. The processor platform 1200 can be, for example, a server, a personal computer, a workstation, a self-learning machine (e.g., a neural network), a mobile device (e.g., a cell phone, a smart phone, a tablet such as an IPAD™) a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1210. The processor 1210 of the illustrated example is hardware. For example, the processor 1210 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example collector 104, the example sandbox 106, the example feature extractor 108, the example machine learning engine 110, the example feature vector former 114, the example decider 122, the example feature perturbers 128, 900, the example controller 130, the example gradient determiner 902, the example perturbation selector 904, and the example feature vector modifier 906.

The processor 1210 of the illustrated example includes a local memory 1212 (e.g., a cache). The processor 1210 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller. While not shown, programs 102, feature representations 112, benign programs 124, and malware 126 can be stored in the main memory 1214, 1216.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1210. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, CD drives, Blu-ray disk drives, redundant array of independent disks (RAID) systems, and DVD drives.

Coded instructions 1232 including the coded instructions of FIG. 10 and/or FIG. 11 and coefficients of the model 120 may be stored in the mass storage device 1228, in the volatile memory 1214, in the non-volatile memory 1216, and/or on a removable non-transitory computer-readable storage medium such as a CD-ROM or a DVD 1234. In some examples, the coded instructions 1232 are distributed to the computer 1200, and possibly other computers, by a server 1236 via the network 1226. In some examples, the server 1236 is part of a computer software and distribution system. The example server 1236 may, additionally, and/or alternatively, distribute updates to the coded instructions 1232 and/or the coefficients of the model 120. Additionally, and/or alternatively, the coded instructions 1232 and/or the coefficients of the model 120 are distributed via a removable non-transitory computer-readable storage medium such as the CD-ROM or the DVD 1234. In some examples, the CD-ROM or the DVD 1234 is purchased from a retailer, a manufacturer, etc. In some examples, the coded instructions 1232 and/or the coefficients of the model 120 are installed onto the computer 1200 when the computer 1200 is configured and/or manufactured. From the foregoing, it will be appreciated that example methods, apparatus and articles of manufacture have been disclosed that detect adversarial malware. From the foregoing, it will be appreciated that methods, apparatus and articles of manufacture have been disclosed which enhance the operations of a computer to detect adversarial malware and prevent, block, etc. malware attacks. The disclosed methods, apparatus and articles of manufacture improve the efficiency of using a computing device by preventing malware attacks that could prevent the computing device from operating as intended. Furthermore, example methods, apparatus, and/or articles of manufacture disclosed herein identify and overcome malware attacks that cause conventional computing device to cease operating as intended. The disclosed methods, apparatus and articles of manufacture are accordingly directed to one or more improvement(s) in the functioning of a computer or computing device.

Example methods, apparatus, and articles of manufacture to detect adversarial malware are disclosed herein. Further examples and combinations thereof include at least the following.

Example 1 is adversarial malware detector that includes a machine learning engine to classify a first feature representation representing features of a program as benign or malware, a feature perturber to, when the first feature representation is classified as benign, remove a first one of the features to form a second feature representation, and a decider to classify the program as adversarial malware when the machine learning engine classifies the second feature representation as malware.

Example 2 is the adversarial malware detector of example 1, wherein the feature perturber is to, when the second feature representation is classified as benign, to remove a second one of the features to form a third feature representation, and wherein the decider is to classify the program as adversarial malware when the machine learning engine classifies the third feature representation as malware, and classify the program as benign when the machine learning engine classifies the third feature representation as benign.

Example 3 is the adversarial malware detector of example 1, wherein the feature perturber is to identify the first one of the features by determining a gradient associated with the first one of the features.

Example 4 is the adversarial malware detector of example 3, wherein the feature perturber is to determine the gradient using a Jacobian Matrix.

Example 5 is the adversarial malware detector of example 1, wherein the feature perturber is to identify the first one of the features using a Jacobian-based saliency map approach.

Example 6 is the adversarial malware detector of example 1, further including a feature extractor to identify the features of the program.

Example 7 is the adversarial malware detector of example 6, further including a sandbox to execute the program, wherein the feature extractor identifies the features by observing the program execute in the sandbox.

Example 8 is the adversarial malware detector of example 1, wherein the first feature representation is a feature vector, wherein an entry of the feature vector has a first value when a the first one of the features is present, and has a second value when the first one of the features is not present.

Example 9 is the adversarial malware detector of example 8, wherein the feature perturber is to modify the first feature representation to remove the first one of the features by changing an entry of the feature vector corresponding to the first one of the features from the first value to the second value.

Example 10 is a method for detecting malware including loading a program into memory, executing the program in a sandbox, classifying the program as benign or malware based on a first set of features of the program identified in the sandbox, when the program is classified as benign, identifying a second set of features representing a first modification of the program, and classifying the program as adversarial malware when the second set of features is classified as malware.

Example 11 is the method of example 10, further including, when the second feature representation is classified as benign identifying a third set of features representing a second modification of the program, classifying the program as adversarial malware when the machine learning engine classifies the third feature representation as malware, and classifying the program as benign when the machine learning engine classifies the third feature representation as benign.

Example 12 is the method of example 10, further including identifying the first modification of the program by determining a gradient associated with the first one of the features.

Example 13 is the method of example 10, further including identifying the first modification using a Jacobian-based saliency map approach.

Example 14 is the method of example 10, further including identifying the first set of features by observing the program execute in the sandbox.

Example 15 is the method of example 10, further including forming a feature vector having entries for a universe of features, setting a first one of the entries to have a first value when a corresponding one of the first set of features is present, setting the first one of the entries to have a second value when the corresponding one of the first set of the features is not present, and inputting the feature vector to a machine learning engine to classify the program.

Example 16 is an non-transitory computer-readable storage medium storing instructions for detecting adversarial malware that, when executed, cause a processor to at least load a program into memory, execute the program in a sandbox, classify the program as benign or malware based on a first set of features of the program identified in the sandbox, when the program is classified as benign, identify a second set of features representing a first modification of the program, and classify the program as adversarial malware when the second set of features is classified as malware.

Example 17 is the non-transitory computer-readable storage medium of example 16, wherein the instructions, when executed, cause the processor to, when the second feature representation is classified as benign, identify a third set of features representing a second modification of the program, classify the program as adversarial malware when the machine learning engine classifies the third feature representation as malware, and classify the program as benign when the machine learning engine classifies the third feature representation as benign.

Example 18 is the non-transitory computer-readable storage medium of example 16, wherein the instructions, when executed, cause the processor to identify the first modification of the program by determining a gradient associated with the first one of the features.

Example 19 is the non-transitory computer-readable storage medium of example 16, wherein the instructions, when executed, cause the processor to identify the first modification using a Jacobian-based saliency map approach.

Example 20 is the non-transitory computer-readable storage medium of example 16, wherein the instructions, when executed, cause the processor to identify the first set of features by observing the program execute in the sandbox.

Any references, including publications, patent applications, and patents cited herein are hereby incorporated in their entirety by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a non-transitory computer readable medium comprising instructions; and
    at least one processor to execute the instructions to at least:
    classify, using a machine learning engine, a first feature representation representing features of a program as benign or malware, the program to include at least three features;
    utilize a plurality of attack methodologies in parallel to select features for removal;
    when the first feature representation is classified as benign, remove a first one of the selected features to form a second feature representation; and
    classify the program as adversarial malware when the machine learning engine classifies the second feature representation as malware.

2. The apparatus of claim 1, wherein the processor is to execute the instructions to:

when the second feature representation is classified as benign, remove a second one of the selected features to form a third feature representation;

when the machine learning engine classifies the third feature representation as malware, classify the program as adversarial malware; and when the machine learning engine classifies the third feature representation as benign, classify the program as benign.

3. The apparatus of claim 1 including to identify the first one of the selected features by determining a gradient associated with the first one of the features.

4. The apparatus of claim 3 wherein the processor is to execute the instructions to determine the gradient using a Jacobian Matrix.

5. The apparatus of claim 1 wherein the processor is to execute the instructions to identify the first one of the features using a Jacobian-based saliency map approach.

6. The apparatus of claim 1, wherein the processor is to execute the instructions to identify the features of the program.

7. The apparatus of claim 6, further including a sandbox to execute the program.

8. The apparatus of claim 1, wherein the first feature representation is a feature vector, wherein an entry of the feature vector has a first value when the first one of the features is present, and has a second value when the first one of the features is not present.

9. The apparatus of claim 8, wherein the processor is to execute the instructions to modify the first feature representation to remove the first one of the selected features by changing an entry of the feature vector corresponding to the first one of the selected features from the first value to the second value.

10. A method for detecting malware, comprising
loading a program into memory;
executing the program in a sandbox, the program including at least three features;
utilizing a plurality of attack methodologies in parallel to select features for removal;
classifying, using a machine learning engine, the program as benign or malware based on a first set of features of the program identified in the sandbox;
when the program is classified as benign, removing a first selected feature to identify a second set of features representing a first modification of the program; and
classifying the program as adversarial malware when the second set of features is classified as malware.

11. The method of claim 10, further including, when the second feature representation is classified as benign:
removing a second selected feature to identify a third set of features representing a second modification of the program;
classifying the program as adversarial malware when the machine learning engine classifies the third feature representation as malware; and
classifying the program as benign when the machine learning engine classifies the third feature representation as benign.

12. The method of claim 10, further including identifying the first modification of the program by determining a gradient associated with the first one of the features.

13. The method of claim 10, further including identifying the first modification using a Jacobian-based saliency map approach.

14. The method of claim 10, further including identifying the first set of features by observing the program execute in the sandbox.

15. The method of claim 10, further including:
forming a feature vector having entries for a universe of features;
setting a first one of the entries to have a first value when a corresponding one of the first set of features is present;
setting the first one of the entries to have a second value when the corresponding one of the first set of the features is not present; and
inputting the feature vector to a machine learning engine to classify the program.

16. A non-transitory computer-readable storage medium comprising instructions for detecting adversarial malware that, when executed, cause a processor to at least:
load a program into memory, the program to include at least three features;
execute the program in a sandbox;
utilize a plurality of attack methodologies in parallel to select features for removal;
classify, using a machine learning engine, the program as benign or malware based on a first set of features of the program identified in the sandbox;
when the program is classified as benign, remove a first selected feature to identify a second set of features representing a first modification of the program; and
classify the program as adversarial malware when the second set of features is classified as malware.

17. The non-transitory computer-readable storage medium of claim 16, wherein the instructions, when executed, cause the processor to, when the second feature representation is classified as benign:
remove a second selected feature to identify a third set of features representing a second modification of the program;
classify the program as adversarial malware when the machine learning engine classifies the third feature representation as malware; and
classify the program as benign when the machine learning engine classifies the third feature representation as benign.

18. The non-transitory computer-readable storage medium of claim 16, wherein the instructions, when executed, cause the processor to identify the first modification of the program by determining a gradient associated with the first one of the features.

19. The non-transitory computer-readable storage medium of claim 16, wherein the instructions, when executed, cause the processor to identify the first modification using a Jacobian-based saliency map approach.

20. The non-transitory computer-readable storage medium of claim 16, wherein the instructions, when executed, cause the processor to identify the first set of features by observing the program execute in the sandbox.

* * * * *